(12) United States Patent
Sands et al.

(10) Patent No.: US 6,505,854 B1
(45) Date of Patent: Jan. 14, 2003

(54) VEHICLE RESTRAINT SYSTEM

(76) Inventors: Robert W. Sands, 16869 S. 18$^{th}$ Way, Phoenix, AZ (US) 85048; John G. Higgins, 2341 N. Lemon Cir., Mesa, AZ (US) 85215; Kevin J. Keeslar, 1751 W. Flintlock Way, Chandler, AZ (US) 85248

( * ) Notice: Subject to any disclaimer, the term of this patent is extended or adjusted under 35 U.S.C. 154(b) by 0 days.

(21) Appl. No.: 09/950,098

(22) Filed: Sep. 10, 2001

(51) Int. Cl.$^7$ ............................................... B60R 21/18
(52) U.S. Cl. ..................... 280/733; 280/743.1
(58) Field of Search ............................. 280/733, 743.1; 244/122 R, 122 AG

(56) References Cited

U.S. PATENT DOCUMENTS 3,430,979 A * 3/1969 Terry et al. .................. 280/733
6,007,092 A * 12/1999 Martz ......................... 280/733
6,199,898 B1 * 3/2001 Masuda et al. .............. 280/733
6,340,173 B1 * 1/2002 Specht ........................ 280/733

FOREIGN PATENT DOCUMENTS

| GB | 2262720 | * | 6/1993 | ................. 280/733 |
| JP | 6-72268 | * | 3/1994 | |

* cited by examiner

*Primary Examiner*—Eric Culbreth
(74) *Attorney, Agent, or Firm*—Richard A. Speer; Mayer, Brown, Rowe & Maw

(57) ABSTRACT

An inflatable vehicle safety system having a source of inflating gas and an inflatable bag in which a flat, woven hose connects the gas source to the inflatable bag using minimal connecting hardware.

8 Claims, 2 Drawing Sheets

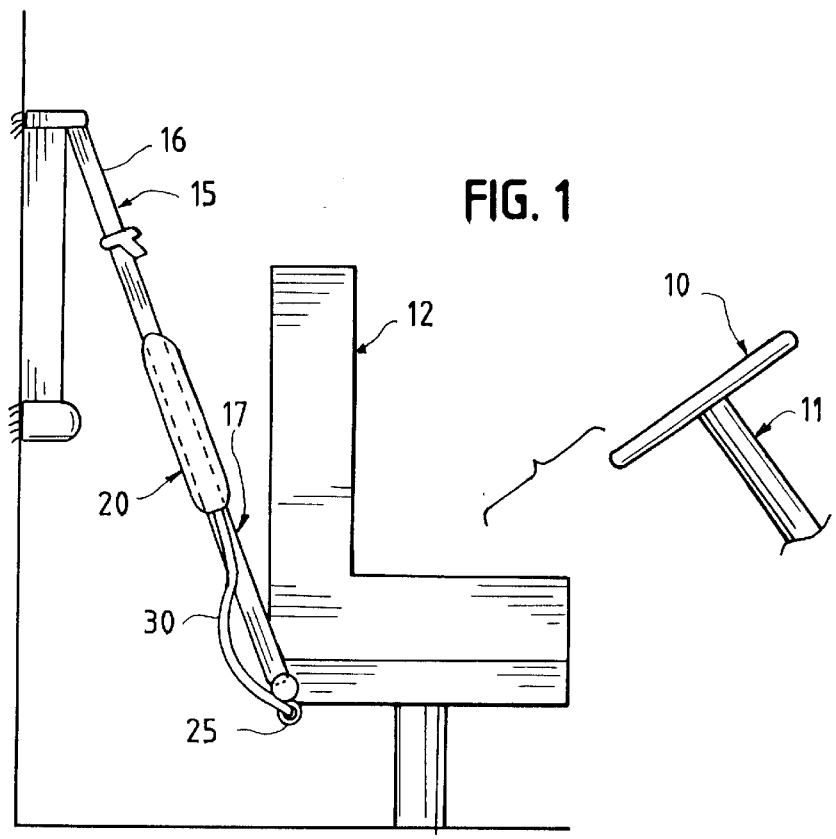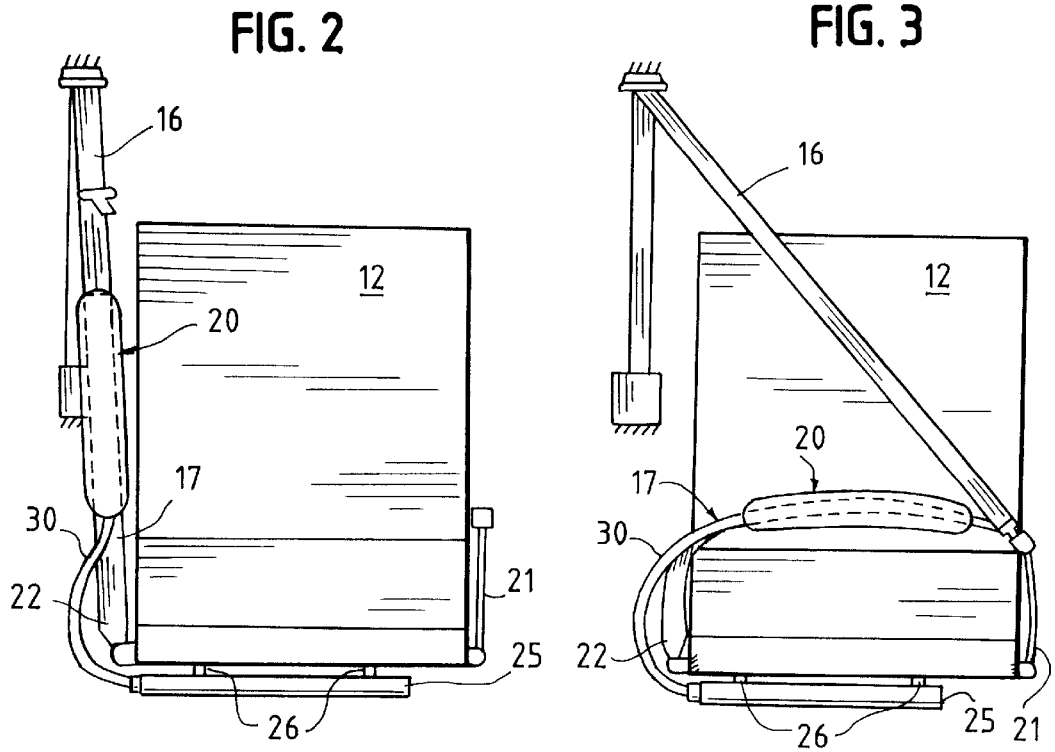

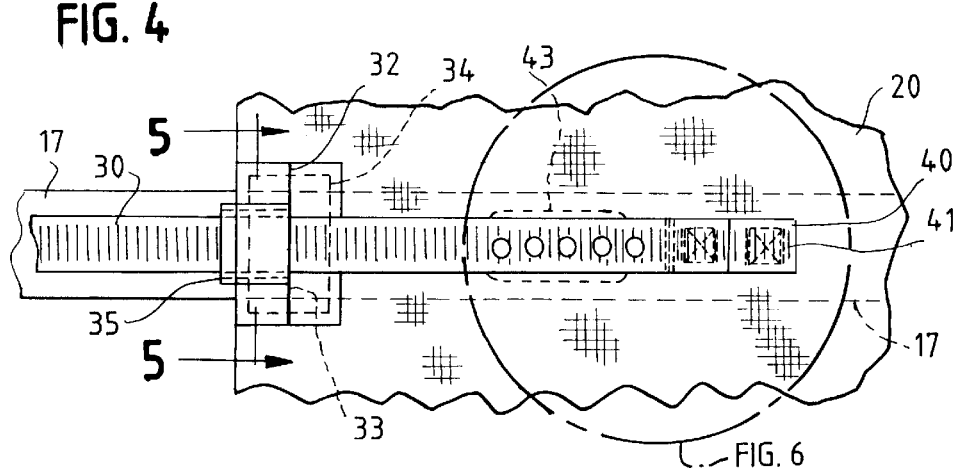
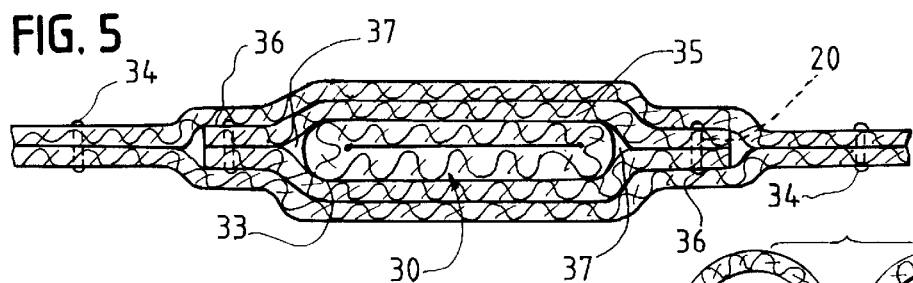
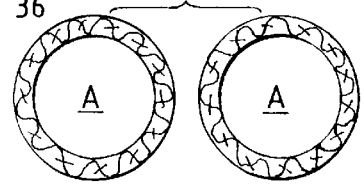
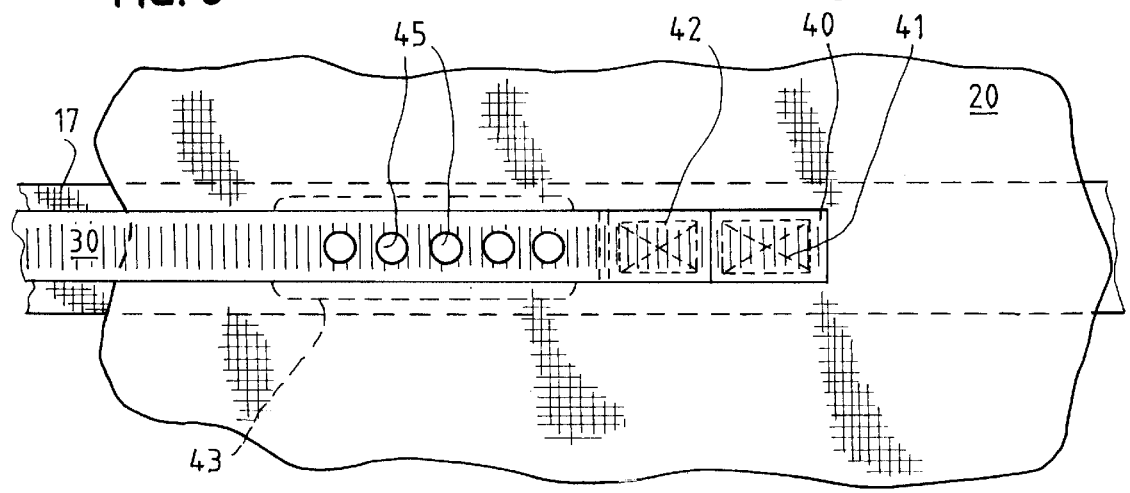
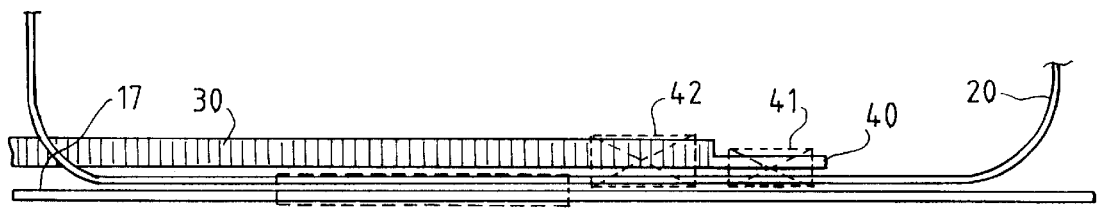

VEHICLE RESTRAINT SYSTEM

BACKGROUND OF THE INVENTION

In the past various types of protective devices have been used in vehicles to reduce injury to occupants during a crash event. In ground transportation vehicles, the protective devices started with lap belts, moved to lap/shoulder harnesses and then added inflatable systems where the inflatable device is stored in a fixed structure. For example, air bags used in automobiles are commonly stored in the steering wheels, instrument panels, side panels and roof rails. In aircraft, the protective devices started with lap belts and have recently introduced seat belt air bags, which have an inflatable member inside or on the seat belt. When deployed, the aircraft seat belt air bag device inflates an air bag into the area in front of the occupant wearing the seat belt. All air bag systems use a crash sensor that identifies a crash event and then activates a gas supply source. The most common automotive driver and passenger air bag systems have the gas source and bag storage co-located in the steering wheel or in the instrument panel. A gas delivery hose of substantially non-flexible construction is used when the gas storage is remote to the air bag storage such as in the aircraft air bag system.

The most common automotive driver and passenger air bag systems require redesigning the steering wheel or the passenger side instrument panel to install the air bag device. In ground vehicles, a seat belt air bag system does not require as much component redesign to install as they replace the seat belt and have the gas source mounted under the seat.

BRIEF SUMMARY OF THE INVENTION

The present invention provides an inflatable bag vehicle safety system which can be conveniently installed in vehicles or aircraft. The system components are light and flexible and require minimal intrusion into driver/passenger space. Cost and installation times are minimized by virtue of the design simplicity of the system, particularly by reducing the number of hard fittings required.

A further improvement is the provision of a gas escape passage where the inflating gas is introduced into the inflatable bag, which escape passage can be accurately sized to control the rate of gas escape bag deflation after a crash event.

The present safety system utilizes a source of pressurized gas which is released to inflate a protective bag. The bag is contained within a suitable protective cover and is located on the lap belt portion of a restraining harness. The restraining harness can be either of the two or three point variety, as desired. A three point restraining system utilizes a shoulder strap whereas a two point system uses only a lap belt, all as well known in the art. When gas is released in response to sensing devices, it flows from the source of gas to the inflatable bag through a flat seamless flexible woven gas supply hose. This hose can be a polyester weave containing strands of kevlar for strengthening and can be coated internally with polyurethane. The use of this flat yet flexible hose saves space and also imparts a suppleness that enhances the user's comfort, as compared to the round gas metal supply tubes used in prior art systems.

The inlet end of the supply hose is connected to the gas source by a standard plastic or metal fitting but the outlet end of the hose which is located in the inflatable safety bag has no fitting whatsoever. Specifically, the outlet end of the hose is positioned within the inflatable bag and secured to the bag but not to the underlying lap belt part. The lap belt part is in the preferred embodiment secured to the bag at a location other than where the hose is attached to the bag.

BRIEF DESCRIPTION OF THE DRAWINGS

FIG. 1 is a schematic side elevation of the present safety system, as used with a 3-point safety belt;

FIG. 2 is a front elevation of the system of FIG. 1 with the safety belt in stored position;

FIG. 3 is a view like FIG. 2 with the belt in the operative position;

FIG. 4 is a top plan view with parts broken away, showing the hose entry into the bag;

FIG. 5 is a view taken along the line 5—5 of FIG. 4;

FIG. 6 is a portion of the inflatable bag removed, showing the connections between the supply hose and the inflatable bag and safety belt;

FIG. 7 is a side elevation of FIG. 6; and

FIG. 8 is a diagrammatic view showing that the cross-sectional area of the opening from the bag inflating hose into the inflatable bag is at least as great as the cross-sectional area of the hose.

DETAILED DESCRIPTION OF THE INVENTION

For a clearer understanding of the invention, reference is made to the figures of the drawings and first to FIG. 1 wherein the numeral 10 indicates a steering wheel, column 11 and a seat structure 12 of the general type that might be found in a commercial vehicle, such as a delivery van, school bus or the like. Shown in back of seat 12 is a restraint system 15 that is illustrated as being of the three point type. In this type of system, there is a restraining shoulder strap 16 and a lap belt part 17 that extends across the user's lap when in the restraining position. Also present in the present restraint system is an inflatable bag 20 that is mounted on the belt part 17 in a position causing the bag 20 to occupy a location in the lap of an occupant, when the belt part 17 is drawn across the occupant's body. The lap belt part 17 is one of two belt parts that make up the lap portion of the restraining belt, the other lap belt part being that indicated by the numeral 21 which is attached at one end to the vehicle in the same manner as the end 22 of strap 17.

Located beneath seat 12 is a source of inflating gas 25 which can be suspended from the bottom of seat 12 as by brackets 26 or by any other suitable means. Alternatively, the gas supply could be located on the floor of the vehicle if the vehicle construction permitted this sort of part disposition. Extending from the source of inflating gas 25 is the flat seamless woven flexible gas supply hose 30 which at a first end is connected to the source of inflating gas 25 by a standard screw fitting or the like. The hose extends upwardly from gas source 25 along side or internal to the strap 17 until it enters the inflatable bag 20.

Referring to FIG. 4, hose 30 can be seen as inserted into the interior of inflatable bag 20 through a cut or slit 32 in the wall of inflatable bag 20. The opening formed by the slit 32 has inserted into it a fabric collar 33 which is sewn internally in the bag 20 along the stitching lines 34. An extension 35 formed on collar 33 extends outwardly of the slit 32 from the interior of inflatable bag 20. On each side of the supply hose 30, the extension 35 has stitching lines 36 which define the lateral limit of the opening through which supply tube 30 is inserted to the interior of bag 20. By varying the position of stitch lines 36 with respect to the lateral limits of the flat woven hose 30, the size of the opening space 37 between the wall of tube 30 when it is inflated and the wall defining the opening through extension 35 can be controlled for passage of either greater or lesser amounts of air after the bag has been inflated.

FIG. 5, which is a view taken along the lines 5—5 of FIG. 4, shows the overlapping relationship of the collar 33, the bag 20 and the hose 30 and the opening 37 that limits the release of gas from the inflated bag 20.

FIG. 6 illustrates the manner in which a portion of the second end of hose 30 specifically the end that is located within bag 20, is attached in position within the bag. First, it should be noted (FIG. 7) that a portion of the end of hose 30 has been removed so that this portion of the end of the hose is only one-half its thickness of the remainder of the hose. This reduction in thickness of the hose permits the fastening structure, specifically the stitching illustrated in FIGS. 6 and 7, to securely fasten the hose 30 to the wall of bag 20. Alternatively, hose 30 can be sewn to the bag 20 without removal of a portion of the hose wall, but use of the single wall portion is preferred to achieve surety of the fastening. This reduced section of hose which is identified by the numeral 40 in FIG. 7 is held in position by the stitching, fastening structure, i.e. illustrated at 41 which extends only between the reduced portion 40 and the wall of the bag 20. To the left of the reduced section 40, there is shown additional stitching 42 which also extends between the hose and the bag but which in this case acts to shut or close the end of the supply tube 30 to prevent the passage of air through the end of the tube. Additional fastening structure (stitching) is identified by the numeral 43 and this stitching extends only between the bag 20 and the lap belt part 17. From this construction, it can be seen that there is a physical connection between the supply hose and the bag 20 on the one hand, and a connection only between belt 17 and bag 20 on the other. This type of connection between the elements of the safety system are preferred, although it may be possible for other interconnections to be made between these parts.

Referring to FIG. 6, is will be seen that the length of hose 30 adjacent to the second end of the inner length of supply hose 30 contained within bag 20 has been formed with a plurality of gas outlet ports 45 to provide for the entry of gas into the bag 20 from the source of inflating gas 25 via the supply tube 30. It will be appreciated that when the gas supply 25 is activated, the pressure of the gas entering the flat supply tube 20 will cause the tube to become circular in cross section. Although a plurality of openings 40 have been illustrated, other exit hole configurations can be used as well. For example, an elongated opening could replace the plurality of holes, or the end of the tube could be left unclosed. The requirement is that whatever the size of the exit from the supply tube into the bag is the cross sectional area should, for optimal operation, be equal to or greater than the cross sectional area of the inflated tube. For example, as diagrammatically shown in FIG. 8, the cross-sectional area "A" of the unsealed inner end of hose 30 is at least as large (it can be larger, but not significantly smaller) as the cross-sectional area "A". Cross-sectional A' represents a section taken at any location along the length of hose 30. If a plurality of openings are used to transport gas from hose 30 into bag 20, such as openings 45, the combined areas of the openings must be at least as great as area A.

The invention may be embodied in other specific forms and the form described above is to be preferred but is not intended to be limiting to the scope of the invention described.

What is claimed is:

1. A restraint system for protecting vehicle passengers comprising:

(a) a safety belt having two parts, each part being connected at one end to the vehicle;

(b) connecting elements on each of the two parts for joining the belt parts about an occupant's body;

(c) an inflatable bag attached to one of the belt parts for inflation upon occurrence of a crash event;

(d) structure defining an opening from the exterior to the interior of the bag;

(e) a source of inflating gas;

(f) a flat, seamless woven inflatable single length of gas supply hose having a first end connected to the source of inflating gas, the supply hose extending freely through the opening in this bag and terminating with a second end and a length of hose adjacent to the second end located within the inflatable bag;

(g) attachment structure securing the length of the gas supply hose adjacent to the second end thereof to the inflatable bag;

(h) attachment structure securing the bag to the belt; and (i) at least one opening in length of the gas supply hose located within the inflatable bag to enable gas to flow from the interior of the hose into the bag.

2. A restraint system as defined in claim 1 wherein the cross-section area of the opening in the second end of the gas supply hose is at least as great as the cross-sectional area of the supply hose in an inflated condition.

3. A restraint system as defined in claim 2 wherein the attachment structure is stitching.

4. A restraint system as defined in claim 1 wherein a plurality of openings are present in the gas supply hose to enable flow of gas from the interior of the hose into the bag.

5. A restraint system as defined in claim 1 wherein the inflatable bag has an opening of pre-selected size greater than the size of the inflatable gas supply hose to limit release of gas from the bag after inflation thereof.

6. A restraint system as defined in claim 5 wherein the opening of pre-selected size is a fabric collar that is sewn to the inflatable bag and through which the gas hose is inserted into the bag.

7. A restraint system for protecting vehicle passengers comprising:

(a) a safety belt having two parts, each part being connected at one end to the vehicle;

(b) connecting elements on each of the two parts for joining the belt parts about an occupant's body;

(c) an inflatable bag attached to one of the belt parts for inflation upon occurrence of a crash event;

(d) structure defining an opening from the exterior to the interior of the bag;

(e) a source of inflating gas;

(f) a flat, seamless woven inflatable single length of gas supply hose having a first end connected to the source of inflating gas, the supply hose extending freely through the opening in this bag and terminating with a second end and a length of hose adjacent to the second end located within the inflatable bag;

(g) attachment structure securing the length of the gas supply hose located within the inflatable bag to the gas supply hose located within the inflatable bag to the inflatable bag and closing the second end of the gas supply hose.

8. A restraint system as defined in claim 7 wherein the second end of the gas supply hose has a length of single wall thickness and the attachment structure is located in the length of single wall thickness and in a length of double wall thickness.

* * * * *